United States Patent [19]

Geisthoff et al.

[11] Patent Number: 4,639,162
[45] Date of Patent: Jan. 27, 1987

[54] DRAWING LOCK FOR TORQUE TRANSMITTING ENGAGEMENT BETWEEN TWO SHAFT MEMBERS ARRESTABLE IN THE OPEN POSITION

[75] Inventors: Hubert Geisthoff; Theo Buthe, both of Lohmar; Felix Mikeska, Siegburg, all of Fed. Rep. of Germany

[73] Assignee: Jean Walterscheid GmbH, Lohmar/Rhld. 1, Fed. Rep. of Germany

[21] Appl. No.: 836,096

[22] Filed: Mar. 4, 1986

[30] Foreign Application Priority Data

Mar. 29, 1985 [DE] Fed. Rep. of Germany ....... 3511576
Oct. 31, 1985 [DE] Fed. Rep. of Germany ....... 3538708

[51] Int. Cl.$^4$ .............................................. F16B 7/00
[52] U.S. Cl. .................................. 403/316; 403/328; 403/325
[58] Field of Search ............... 403/325, 322, 327, 328, 403/316, 317

[56] References Cited

U.S. PATENT DOCUMENTS 3,747,966  7/1973  Wilkes .................................. 403/322
4,402,626  9/1983  Recker .............................. 403/317 X
4,579,456  4/1986  Post ..................................... 403/322

FOREIGN PATENT DOCUMENTS 2850087  10/1981  Fed. Rep. of Germany .

Primary Examiner—Andrew V. Kundrat
Attorney, Agent, or Firm—Toren, McGeady & Goldberg

[57] ABSTRACT

In a mechanism for connecting together in torque transmitting engagement a coupling sleeve and a power takeoff shaft, particularly in agricultural implements, there is provided a drawing lock which may be arrested in the open position. The drawing lock includes a locking ring which holds a plurality of radially movable torque transmitting balls in their locked position during torque transmission of the assembly. A slotted spring ring is provided which engages the torque transmitting balls to hold them radially inwardly thereby to arrest the device in the open position. When a power takeoff shaft is inserted into the bore of the coupling sleeve, the torque transmitting balls are moved radially outwardly and, as a result, the slotted spring ring resiliently expands in diameter thereby to cause a first stop face of the ring to become disengaged from a supporting face of a supporting ring which is axially affixed to the coupling sleeve. The slotted ring then moves axially out of engagement with the torque transmitting balls and a second stop face on the ring engages the supporting face of the supporting ring. In accordance with a second embodiment of the invention, the slotted spring ring is provided with a member bridging the slot thereof extending across both ends, but permitting relative movement between the ends of the ring so as to ensure corresponding movement of both ends, even where only one end of the ring is urged radially outwardly by a torque transmitting ball.

10 Claims, 11 Drawing Figures

DRAWING LOCK FOR TORQUE TRANSMITTING ENGAGEMENT BETWEEN TWO SHAFT MEMBERS ARRESTABLE IN THE OPEN POSITION The present invention relates generally to a mechanism for connecting two shaft members together in torque transmitting engagement and more particularly to a drawing lock arrestable in the open position. The device of the invention is especially suitable for connecting the power takeoff shaft of a tractor to the drive shaft of an agricultural implement.

Devices of the type to which the invention relates generally consist of a coupling sleeve having an axial profile designed as a throughbore and radial apertures, and of blocking members which are guided in the radial apertures and which, in the locked position, are embraced by a locking ring loaded by the force of a spring, and of a gripping sleeve connected to the locking ring.

A drawing lock arrestable in the open position is known in the prior art from DE-PS No. 28 50 087. With this design, the locking ring is provided with a spring-loaded blocking member which is engageable against a stop of the coupling sleeve and which may be released from the arrested position by a separate sensing pin.

In devices having this design, the release from the arrested position must be effected by a single sensing pin and the spring-loaded blocking member must be relatively small, and, therefore, it has a low strength and does not withstand frequent use, i.e., frequent transfer of the drawing lock into the arrested open position.

Furthermore, the coupling sleeve is weakened by the provision of an additional bore for receiving the sensing pin and it may fail unless it is built extremely large to compensate for such weakness.

The present invention is directed to providing a drawing lock arrestable in the open position which is of a relatively short length and has a small outer diameter so that it is suitable for use in small tractors.

The invention is further directed to providing a drawing lock arrestable in the open position which, with at least two blocking members representing axial securing means and independently of the angular position of the slot of the slotted spring ring relative to the remaining parts of the drawing lock, can safely and accurately be transferred from the arrested open position into the locked position, with easy fitting being ensured at the same time.

SUMMARY OF THE INVENTION

Briefly, the present invention may be described as a drawing lock for connecting in torque transmitting engagement two shaft members, with one of the members being formed as a coupling sleeve defining a bore adapted to receive therein the other shaft member in torque transmitting engagement. The coupling sleeve is provided with a plurality of radial apertures within which blocking members, such as spherical balls, are radially movable to engage within an annular groove formed in the shaft member so as to lock the two shaft members in rotative engagement. A locking ring is provided which engages about the blocking members to hold them in engagement with the shaft and spring means are provided which exert a force on the locking ring. A gripping sleeve is connected to the locking ring for enabling axial movement thereof and the gripping sleeve is shaped to define a free space on the side of the locking ring toward the direction from which the shaft is inserted into the bore of the coupling sleeve.

In accordance with the first embodiment of the invention, a slotted spring ring is provided in the free space defined by the gripping sleeve, the ring being annularly discontinuous so that it may resiliently, radially expand and contract. A supporting ring is axially affixed to the coupling sleeve and defines a supporting face for engagement with the spring ring. The slotted spring ring is configured with a stepped configuration defining a first axially acting stop face and a second axially acting stop face, with the second stop face being axially spaced from the first stop face and being located radially inwardly thereof. A continuous bead is formed on the slotted spring ring adjacent the second stop face and, in the operation of the device, the slotted spring ring is locked in a position with the continuous bead in engagement with the blocking members to hold the drawing lock arrested in the open position when no shaft is inserted in the bore of the coupling sleeve by engagement of the first stop face of the spring ring with the supporting face. When a shaft is inserted into the bore of the coupling sleeve, a radially outward force is exerted on the blocking members, thereby tending to radially expand the slotted spring ring and the first stop face slips off the supporting face of the supporting ring, thereby enabling the slotted spring ring to move axially so that the second stop face thereof may become engaged with the supporting ring in order to allow the drawing lock to be brought into the locked position with the blocking members in engagement within the annular groove of the shaft and held there by the locking ring.

In accordance with a second embodiment of the present invention, the ends of the slotted spring ring positioned on either side of the slot are connected together by bridge means which will enable them to undergo corresponding movement in the radial direction during resilient radial expansion and contraction of the spring ring.

Thus, in accordance with the first embodiment of the invention, the objectives thereof are achieved in that:

(a) in the free space of the gripping sleeve formed at the end of the locking ring facing the slipping-on direction of the coupling sleeve, provision is made for a slotted spring ring;

(b) at the end of the coupling sleeve facing the slipping-on direction, the supporting ring having a supporting face is held so as to be axially unmovable;

(c) the inner bore of the slotted spring ring is designed with a stepped configuration in such a way that starting from its end facing the slipping-on direction, provision is made for the first axially acting stop face and, at an axial distance from it, a second axially acting stop face is provided whose outer diameter is smaller than that of the first stop face; and (d) a continuous bead has been arranged at the slotted spring ring adjacent the second stop face.

The advantage of the drawing lock, in accordance with the invention, is that the slotted spring ring supports the locking ring in the locked position against the force of the spring loading it and it also secures the arrested open position.

In view of the fact that the drawing lock, both in the locked position and in the arrested open position, is centered via the supporting ring and in the locked position is additionally centered via the blocking member, there is no need for close tolerance guides, as a result of which, the drawing lock is insensitive to any dirt which invariably penetrates in agricultural work.

In an advantageous feature of the first embodiment of the invention, if there are only two blocking members representing axial securing means of the coupling sleeve on the power takeoff shaft, the first stop face runs out at a distance from the slot of the spring ring at both ends and the end portions adjacent the slot are formed as tapered faces.

If only two blocking members are used, it is possible, quite by accident, that one of the blocking members may load the slotted spring ring unilaterally in the vicinity of the slot radially outwardly, as a result of which, part of the slotted spring ring positioned at the other end of the slot is not pushed radially outwardly thereby preventing the first stop face from being accurately pressed off the supporting ring so that the drawing lock may not be able to snap accurately from the arrested open position into the locked position.

In accordance with the second embodiment of the invention, the objectives thereof are achieved in that the ends of the slotted spring ring positioned on either side of the slot are connected to each other so as to carry out corresponding movements in the radial direction by a bridge guided so as to be circumferentially movable in at least one of the two ends.

The advantage of the drawing lock arrestable in the open position in accordance with the invention is that the slotted spring ring does not require any anti-turning means in order to ensure an accurate changeover from the arrested open position into the locked position. This leads to a further advantage in that there can be no assembly errors when fitting the drawing lock which subsequently may easily be fitted to an existing yoke.

By an advantageous feature of the second embodiment of the invention, the slotted spring ring, at one of its end faces, is provided with a circumferential groove in which there is guided a spring-loaded ring which covers the slot and one end of which is non-rotatingly connected to the slotted spring ring.

This measure ensures that the spring force of the slotted spring ring is increased in the radial direction and that, when loading only one end of the slotted spring ring by a radially outwardly directed movement of a blocking member effected by slipping the coupling sleeve onto the power takeoff shaft, the slotted spring ring is transferred accurately from the first axially acting stop face to the second axially acting stop face of the supporting ring, thereby ensuring an accurate transfer of the drawing lock from the arrested open position into the locked position.

With this solution, the carrying face of the first stop face is not reduced in size.

As only one of the ends of the spring-loaded ring is connected to the slotted spring ring, the slot can expand in the circumferential direction so that the radial springiness of the slotted spring ring is not adversely affected.

According to a further advantageous feature of the second embodiment of the invention, both ends of the slotted spring ring are provided with a circumferential recess covering a limited angle range, with an annular portion extending across the slot being guided in the recesses.

With this embodiment, the slotted spring ring, in the regions adjoining the slot, may be provided with an angularly limited circumferential groove or these regions may comprise bores for accommodating the annular portion.

According to a further advantageous feature of the invention, one of the ends of the slotted spring ring is provided with a projection extending in the circumferential direction and guided in a recess arranged at the other end of the slotted spring ring.

This measure ensures a particularly inexpensive design of the slotted spring ring as the projection at one end of the slotted spring ring may be integral with it.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DETAILED DESCRIPTION OF THE PREFERRED EMBODIMENTS

Figure 1:
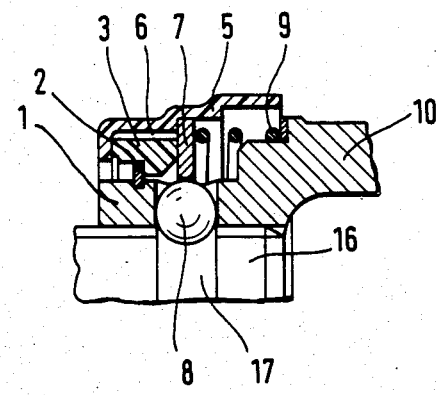
FIG. 1 is a partial sectional view through a drawing lock shown in the locked position.

Referring now to FIGS. 1-5 wherein there is shown a drawing lock in accordance with a first embodiment of the invention, a coupling sleeve 1 is provided with a bore 18 within which a power takeoff shaft 16 may be inserted so as to be placed in torque transmission therewith by spline means (not shown) interposed between the coupling sleeve 1 and the shaft 16.

The coupling sleeve 1 is followed by a yoke 10 (indicated only). A supporting ring 2 held on the coupling sleeve 1 so as to be axially unmovable defines a supporting face 4. A gripping sleeve 5 covering the drawing lock towards the outside contains a locking ring 7 against which one end of a pressure spring 9 is supported. The other end of the pressure spring 9 is supported against a projection of the coupling sleeve 1.

A slotted spring ring 3 is provided adjacent the locking ring 7. The ring 3 is formed with a slot 15 (see FIG. 3) and with a first stop face 11, a second stop face 12 and a continuous bead 13.

The shaft 16 is provided with an annular groove 17 into which blocking members 8 engage. The members 8 are radially movable within radial apertures formed in the coupling sleeve 1.

Figure 2:
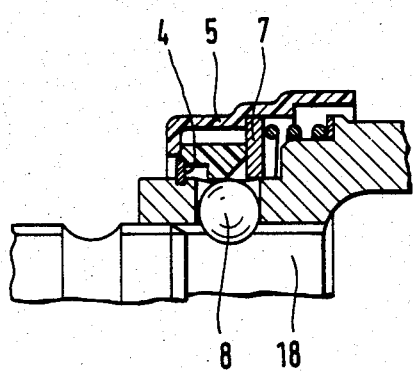
FIG. 2 is a partial sectional view showing the drawing lock in the arrested open position.

As indicated in FIGS. 1 and 2, the shaft 16 may be inserted into the bore 18 from the left, as viewed in the drawings, and the gripping sleeve 5 is configured so as to define a free space 6 on the side of the locking ring 7 facing the slipping-on end of the sleeve 1.

The free space 6 facing the slipping-on end contains the slotted spring ring 3 which, in the locked position, is supported with its second stop face 12 on the axial supporting face 4 of the supporting ring 2. In the locked position, the blocking members 8 engage into the annular groove 17 of the power takeoff shaft 16 associated with a tractor, for example.

To release the locked position, the gripping sleeve 5 is moved in a direction opposite to the slipping-on direction of the coupling sleeve 1, as a result of which, the locking ring 7 is moved out of its locking position for the blocking members 8. After removal of the coupling sleeve 1 from the power takeoff shaft 16, the blocking members 8 move radially inwardly until they rest against stops preventing them from falling out into the profiled bore 18 of the coupling sleeve 1. This movement is effected by the radially inwardly directed spring force of the slotted spring ring 3. In the process, the slotted spring ring 3 reduces its diameter so that the first stop face 11 rests against the supporting face 4 of the supporting ring 2, as a result of which, the arrested open position of the drawing lock is ensured.

When the coupling sleeve 1 is again slipped onto the power takeoff shaft 16, the blocking members 8 are moved radially outwardly and lift the first stop face 11 of the slotted spring ring 3 from its position of contact with the axial supporting face 4, thereby releasing the arrested open position of the drawing lock.

As soon as the blocking members 8 reach the annular groove 17 of the power takeoff shaft 16, they drop into it while being supported by the force of the spring 9 acting on the locking ring 7 so that the locking ring 7 is again slipped over the blocking members 8, thereby ensuring the locked position. Again, as illustrated in FIG. 1, the slotted spring ring 3, with its second stop face 12, rests against the axial supporting face 4 of the supporting ring 2.

If only two oppositely arranged blocking members 8 are used, there is a risk of one of the blocking members 8 acting unilaterally in the vicinity of the slot 15 onto the slotted spring ring 3, in which case, the part of the slotted spring ring 3 positioned at the other end of the slot 15 does not carry out a radially outwardly directed lifting movement. In such a case, the slotted spring ring 3 might be caught at the axial supporting face 4 of the supporting ring 2 in this area.

Figure 3:
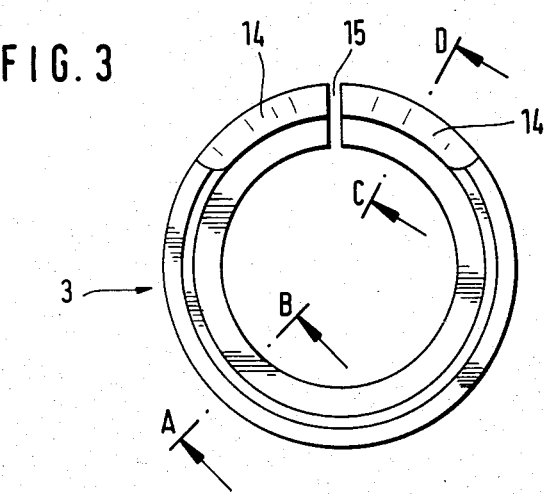
FIG. 3 is a plan view of the slotted spring ring.
Figure 5:
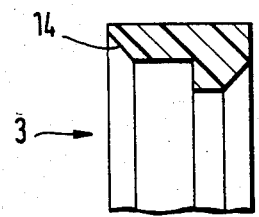
FIG. 5 is a partial cross-section through the slotted spring ring taken along line C-D of FIG. 3.

In order to avoid this, the area of the first stop face 11 of the slotted spring ring 3 adjoining the slot 15 is provided with an inclined face 14, as illustrated in FIGS. 3 and 5. In this way, it is ensured that, independently of the position of the slot 15 relative to the blocking members 8, the slotted spring ring 3 fully carries out its switching over function.

Figure 4:
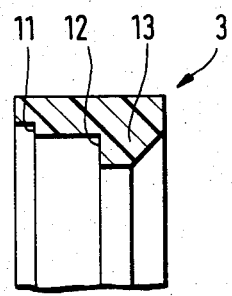
FIG. 4 is a partial cross-section through the slotted spring ring taken along line A-B of FIG. 3.

FIG. 4 shows a partial section through the slotted spring ring 3 outside the area of the inclined face 14.

Thus, from the foregoing, it will be seen that the present invention provides a drawing lock arrestable in the open position which is of short length and has a small outer diameter so that it is suitable for use in small tractors.

In accordance with the invention, the objectives thereof are achieved in that, in a free space 6 of the gripping sleeve 5 formed at the end of the locking ring 7 facing the slipping-on direction of the coupling sleeve 1, provision has been made for a slotted spring ring 3, that at the end of the coupling sleeve 1 facing the slipping-on direction, a supporting ring 2 having a supporting face 4 is held so as to be axially unmovable, that the inner bore of the slotted spring ring 3 is designed to be step-shaped in such a way that starting from its end facing the slipping-on direction, provision has been made for a first axially acting stop face 11 and, at an axial distance from it, a second axially acting stop face 12 whose outer diameter is smaller than that of the first stop face 11 and that adjacent to the second stop face 12, a continuous bead 13 has been arranged at the slotted spring ring 3.

A second embodiment of the invention is shown in FIGS. 6–11. The second embodiment differs from the first embodiment described in connection with FIGS. 1–5 principally in that bridge means are provided in the slotted spring ring bridging the slot 15 to ensure corresponding movement of the ends of the ring 3. Otherwise, the second embodiment operates very much like the first embodiment.

Figure 6:
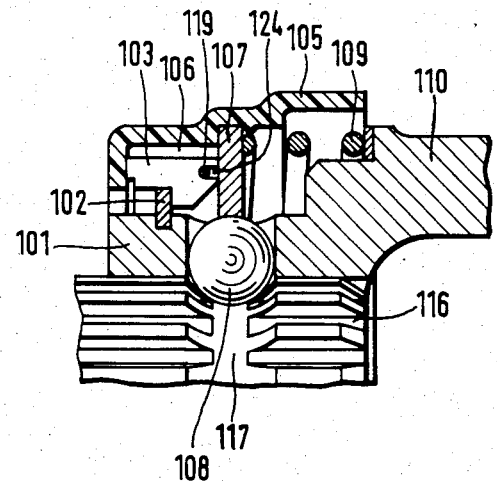
FIG. 6 is a partial sectional view showing a drawing lock in the locked position in accordance with a second embodiment of the invention.
Figure 7:
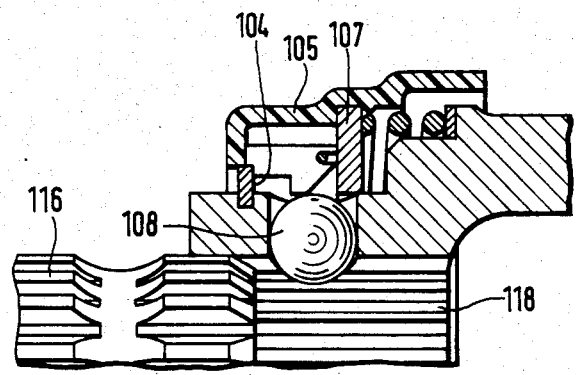
FIG. 7 is a sectional view showing the drawing lock of FIG. 6 in the arrested open position.

As shown particularly in FIGS. 6 and 7, the second embodiment of the invention comprises a coupling sleeve 101 followed by a yoke 110 (indicated only). A supporting ring 102 is held on the coupling sleeve 101 so as to be axially unmovable. A gripping sleeve 105 covering the drawing lock towards the outside contains a locking ring 107 against which one end of a pressure spring 109 is supported. The other end of the pressure spring 109 is supported against a projection of the coupling sleeve 101.

A free space 106 facing the slipping-on end contains the slotted spring ring 103 which, in the locked position, is supported with its second stop face 112 on an axial supporting face 104 of the supporting ring 102. In the locked position, blocking members 108 engage into an annular groove 117 of a power takeoff shaft 116 associated with a tractor, for example.

The end faces of the slotted spring ring 103 facing the locking ring 107 have been provided with a circumferential groove 124 in which bridge means in the form, for example, of a spring ring 119 made of spring steel wire is guided.

To release the locked position, the gripping sleeve 105 is moved in the direction opposite to the slipping-on direction of the coupling sleeve 101, as a result of which, the locking ring 107 is moved out of its locking position for the blocking members 108 and these can move radially outwardly. After removal of the coupling sleeve 101 from the power takeoff shaft 116, the blocking members 108 move radially inwardly until they rest against stops preventing them from falling out into the profiled bore 118 of the coupling sleeve 101. This movement is effected by the radially inwardly directed spring force of the slotted spring ring 103. In the process, the slotted spring ring 103 reduces its diameter so that the first stop face 111 rests against the supporting face 104 of the supporting ring 102, as a result of which, the arrested open position of the drawing lock is ensured.

When the coupling sleeve 101 is again slipped onto the power takeoff shaft 116, the blocking members 108 are moved radially outwardly and lift the first stop face 111 of the slotted spring ring 103 from its position of contact with the axial supporting face 4, thereby releasing the arrested open position of the drawing lock.

As soon as the blocking members 108 reach the annular groove 117 of the power takeoff shaft 116, they drop into it while being supported by the force of the spring 109 acting on the locking ring 107 so that the locking ring 107 is again slipped over the blocking members 108, thereby ensuring the locked position. Again, as illustrated in FIG. 6, the slotted spring ring 103, with its second stop face 112, rests against the axial supporting face 104 of the supporting ring 102.

By inserting an additional spring ring 119 into the slotted spring ring 103, it is ensured that, even if only one of the ends 126, 127 of the slotted spring ring 103 is loaded radially outwardly by a blocking member 108, the slotted spring ring 103 accurately lifts from the supporting ring 102 with its two ends 126, 127.

As soon as the blocking members 108 reach the annular groove 117 of the power takeoff shaft 116, they drop into it, supported by the force of the spring 109 acting on the locking ring 107, so that the locking ring 107 is again pushed over the blocking members 108, thereby ensuring the locking position. As illustrated in FIG. 6, the slotted spring ring 103, with its second stop face 112, again rests against the axial supporting face 104 of the supporting ring 102.

Figure 8:
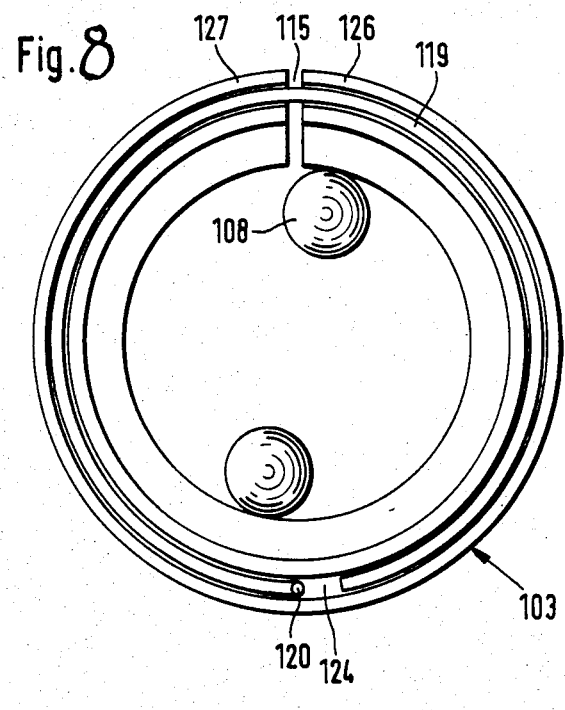
FIG. 8 is a plan view of the slotted spring ring in accordance with the second embodiment of the invention with an inserted additional spring ring.

As shown in FIG. 8, the additional spring ring 119 inserted into the slotted spring ring 103 and bridging the ends 126, 127 positioned at both ends of the slot 115 of the slotted spring ring 103 ensures that, even if only two blocking members 108 are used to load the slotted spring ring 103, the two ends 126, 127 of the slotted spring ring 103 carry out corresponding movements.

One end of the spring ring 119 shown in FIG. 8 has been provided with an angled portion 120 onto which a bore of the slotted spring ring 103 engages, thereby ensuring that the spring ring 119 cannot turn relative to the slotted spring ring 103.

Figure 9:
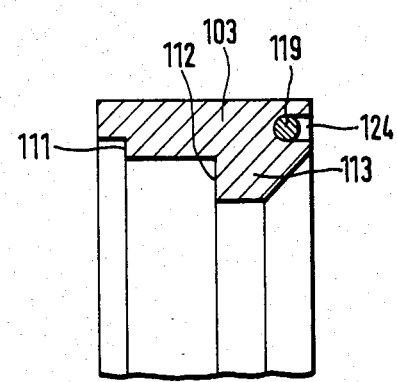
FIG. 9 is a partial cross-section of the slotted spring ring with the inserted spring ring according to the second embodiment.

FIG. 9 shows a partial section of the slotted spring ring 103. It also shows how the spring ring 119 is fitted into the circumferential groove 124. In addition, FIG. 9 illustrates the first stop face 111 which is important for the functioning of the drawing lock, as well as the second stop face 112 and the adjoining bead 113 acting on the blocking members 108.

Figure 10:
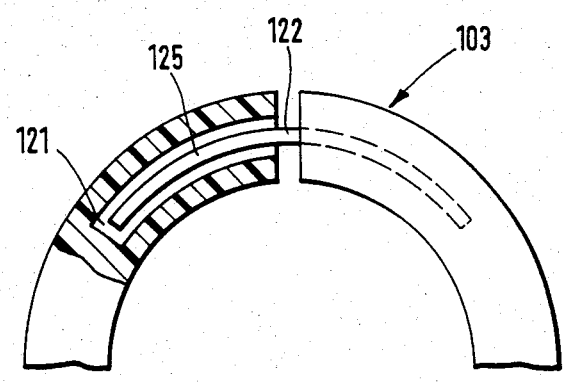
FIG. 10 is a plan view, partially in section, of the slotted spring ring with the two ends of the slotted spring ring being connected by an annular section.

FIG. 10 shows, partially in section, a plan view of a slotted spring ring 103 in the case of which the bridge 122 between the two ends 126, 127 of the slotted spring ring 103 adjoining slot 115 is represented by an arcuate portion 125 engaging into a recess 121.

Figure 11:
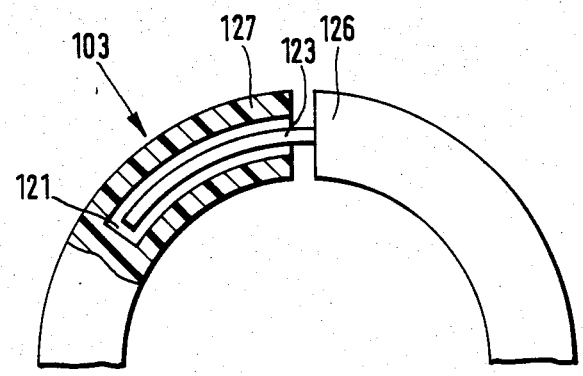
FIG. 11 is a plan view of the slotted spring ring with its two ends being connected by a bracket.

FIG. 11 shows the two ends 126, 127 of the slotted spring ring 103 being connected by a projection 123 engaging into a counterpiece designed either as an arcuate groove 121 or a recess.

Thus, in accordance with the second embodiment of the invention, there is provided a drawing lock arrestable in the open position, which, with at least two blocking members representing axial securing means and independently of the angular position of the slot of the slotted spring ring, can safely and accurately be transferred from the arrested open position into the locked position.

In accordance with the invention, the objective is achieved in that the ends 126, 127 of the slotted spring ring 103 positioned at both ends of the slot 115 are connected to each other so as to carry out corresponding movements in the radial direction by a bridge 122 guided so as to be circumferentially movable in at least one of the two ends 126, 127.

While specific embodiments of the invention have been shown and described in detail to illustrate the application of the inventive principles, it will be understood that the invention may be embodied otherwise without departing from such principles.

What is claimed is:

1. A drawing lock capable of being arrested in an open position for connecting two shafts, particularly a power takeoff shaft of a tractor and a drive shaft of an agricultural implement comprising a coupling sleeve defining a bore adapted to receive a shaft, said shaft being inserted into said bore from a slipping-on direction and being in torque transmitting engagement with said coupling sleeve;

a plurality of radial apertures in said coupling sleeve and blocking members received in said apertures to be radially movable therein, said blocking members being adapted to engage within an annular groove within said shaft received in said bore;

a locking ring engaging said blocking members to hold them in engagement within said annular groove in said shaft;

spring means exerting a spring force on said locking ring;

gripping sleeve connected to said locking ring for enabling axial movement thereof, said gripping sleeve being shaped to define a free space on the side of said locking ring toward said slipping-on direction;

a slotted spring ring provided in said free space;

a supporting ring axially affixed to said coupling sleeve defining a supporting face located for engagement with said spring ring;

said slotted spring ring being configured with a stepped configuration on a side thereof facing toward said slipping-on direction defining a first axially acting stop face and a second axially acting stop face, said second stop face being axially spaced from said first stop face and being located radially inwardly thereof; and a continuous bead formed on said slotted spring ring adjacent said second stop face adapted for engaging with said blocking members;

said slotted spring ring being locked in a position with said continuous bead in engagement with said blocking members by engagement of said first stop face with said supporting face and being expanded radially by outward movement of said blocking members to enable a shaft to be inserted in torque transmitting engagement into said bore of said coupling sleeve, said radial expansion of said spring ring causing said first stop face to become disengaged from said supporting face and said second stop face to be brought into engagement therewith.

2. A drawing lock according to claim 1, wherein said slotted spring ring comprises a discontinuous configuration having a pair of adjacent ends separated by a slot and wherein said first stop face runs out and terminates a distance from said slot.

3. A drawing lock according to claim 2, wherein said adjacent ends of said spring ring are formed with a tapered configuration between said slot and the terminal ends of said first stop face.

4. A drawing lock according to claim 1, wherein said spring ring is formed with a discontinuous configuration having a pair of adjacent ends with a slot therebetween, said drawing lock further comprising bridge means extending between said adjacent ends across said slot to effect corresponding movement of said ends during operation of said drawing lock.

5. A drawing lock according to claim 4, wherein said bridge means are arranged to be circumferentially movable relative to at least one of said two ends of said spring ring.

6. A drawing lock according to claim 4, wherein said bridge means comprise a spring-ring extending across said slot.

7. A drawing lock according to claim 6, wherein said slotted spring ring is formed with a circumferential groove within which said spring ring is engaged, said spring ring being freely movable within said circumferential groove relative to both ends of said slotted spring ring.

8. A drawing lock according to claim 4, wherein said slotted spring ring is formed with a recess extending internally within one of said ends and wherein said bridge means comprise an arcuate member affixed to the other of said ends and extending into said recess for circumferential movement therein.

9. A drawing lock according to claim 4, wherein both ends of said slotted spring ring are provided with a circumferential recess extending across a limited angular range, with an arcuate portion extending across said slot guided in said recesses.

10. A drawing lock according to claim 4, wherein one of said ends of said slotted spring ring is provided with a projection extending in the circumferential direction of said ring and being guided in a recess formed in the other end of said slotted spring ring.

* * * * *